United States Patent [19]
Ishii et al.

[11] Patent Number: 5,214,084
[45] Date of Patent: May 25, 1993

[54] STABILIZED POLYPROPYLENE RESIN COMPOSITION

[75] Inventors: Tamaki Ishii; Shinichi Yachigo, both of Osaka, Japan

[73] Assignee: Sumitomo Chemical Company, Ltd., Osaka, Japan

[21] Appl. No.: 933,936

[22] Filed: Aug. 24, 1992

Related U.S. Application Data

[63] Continuation of Ser. No. 667,767, Mar. 11, 1991, abandoned.

Foreign Application Priority Data

Mar. 14, 1990 [JP] Japan .................. 2-64727

[51] Int. Cl.$^5$ .................. C08K 5/34; C08K 5/35
[52] U.S. Cl. .................. 524/96; 524/100; 524/102; 524/120; 524/126; 524/153; 524/228; 524/291; 524/392
[58] Field of Search .................. 524/96, 100, 102, 120, 524/126, 153, 228, 291, 392

[56] References Cited

U.S. PATENT DOCUMENTS 4,692,486 9/1987 Gugumus .................. 524/100
4,985,479 1/1991 Nagasaki et al. .................. 524/96

OTHER PUBLICATIONS

Patent Abstracts of Japan–vol. 13 No. 42 C–564 [3390] (Jan. 30, 1989).

*Primary Examiner*—Kriellion S. Morgan
*Attorney, Agent, or Firm*—Cushman, Darby & Cushman

[57] ABSTRACT

A polypropylene resin containing an α-olefinic copolymer rubber and an inorganic filler is stabilized by incorporating therein the following 6 components:

(A) a hindered phenolic compound having a molecular weight of not less than 500, (B) a high-molecular hindered piperidine compound such as poly[{6-(1,1,3,3-tetramethylbutyl)amino-1,3,5-triazine-2,4-diyl}{(2,2,6,6-tetramethyl-4-piperidyl)-imino}hexamethylene{(2,2,6,6-tetramethyl-4-piperidyl)imino}], (C) a low-molecular hindered piperidine compound such as 2-methyl-2-(2,2,6,6-tetramethyl-4-piperidyl)amino-N-(2,2,6,6-tetramethyl-4-piperidyl)propionamide, (D) a benzoate compound such as 2,4-di-t-butylphenyl 3,5-di-t-butyl-4-hydroxybenzoate, (E) a phosphorous compound such as bis(2,4-di-t-butylphenyl) pentaerythritol diphosphite, and (F) an amide compound such as ethylene-bisstearylamide. This composition may also contain a sulfur compound such as dialkyl thiodipropionate and pentaerythritol tetrakis(3-alkylthiopropionate). The composition disclosed is stable not only against heat and oxidation but also against light.

20 Claims, No Drawings

STABILIZED POLYPROPYLENE RESIN COMPOSITION

This is a continuation of application Ser. No. 07/667,767, filed Mar. 11, 1991 now abandoned.

The present invention relates to a stabilized polypropylene resin composition containing α-olefinic copolymer rubber and inorganic filler and more particularly, to a polypropylene resin composition having excellent stability not only against heat and oxidation but also against light.

Polypropylene resins have excellent physical, chemical and electrical properties and are useful as materials for fibers, molded articles, sheets, films and the like. For further improvements of impact resistance, rigidity, heat distortion temperature and dimensional stability of polypropylene molded articles, addition of α-olefinic copolymer rubbers and/or inorganic fillers has been widely employed.

Polypropylene resins containing such α-olefinic copolymer rubbers and inorganic fillers are mainly used for parts of automobiles and electric articles, but it is well known that they undergo deterioration by the actions of heat, oxygen and light, thereby lowering their mechanical properties.

Hitherto, various stabilizers have been used for solving these problems. For example, various phenolic compounds such as mentioned below have been used for inhibiting deterioration due to heat and oxidation.

2,6-Di-t-butyl-4-methylphenol,
1,3,5-Tris(3,5-di-t-butyl-4-hydroxybenzyl) isocyanurate,
Tetrakis[3-(3,5-di-t-butyl-4-hydroxyphenyl)propionyloxymethyl]methane.

It is also known to use sulfur compounds such as mentioned below together with these phenolic compounds in order to further improve oxidation inhibitory ability of these phenolic compounds:

Dilauryl thiodipropionate,
Pentaerythritol tetrakis(3-dodecylthiopropionate).

On the other hand, it is known to use various light stabilizers such as benzophenone compounds, benzotriazole compounds, nickel chelate compounds, and hindered amine compounds each alone or in combination for inhibiting deterioration due to light. Furthermore, many proposals have been made to use these known stabilizers or compounds in combination.

However, these conventionally proposed polypropylene resin compositions do not have sufficient stability not only against heat and oxidation, but also against light, and hence, it has been strongly desired to develop stabilizer systems having excellent performance against heat, oxidation and light.

As a result of intensive research conducted by the inventors, it has been found that very excellent performance can be obtained when a specific hindered phenolic compound, a specific high-molecular hindered piperidine compound, a specific low-molecular hindered piperidine compound, a specific benzoate compound, a specific phosphorus compound and a specific amide compound are used in combination, and the present invention has been accomplished. It has been also found that further excellent performance can be obtained by using a specific amount of a specific sulfur compound in combination with the above compounds.

Thus, the present invention provides a polypropylene resin composition which comprises 100 parts by weight of a polypropylene resin mixture comprising a polypropylene, 5 to 40% by weight of an α-olefinic copolymer rubber and 5 to 40% by weight of an inorganic filler, each based on the total weight of the mixture, and said composition further comprising the following components:

(A) 0.01 to 1 part by weight of a hindered phenolic compound having a molecular weight of not less than 500;

(B) 0.01 to 1 part by weight of a high-molecular hindered piperidine compound having a repeating unit selected from the following formulas (B-1) through (B-3):

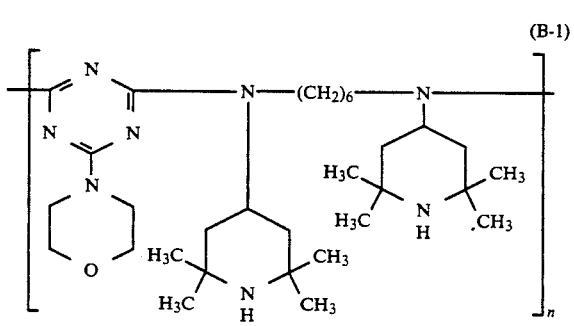

wherein n is 2 to 20,

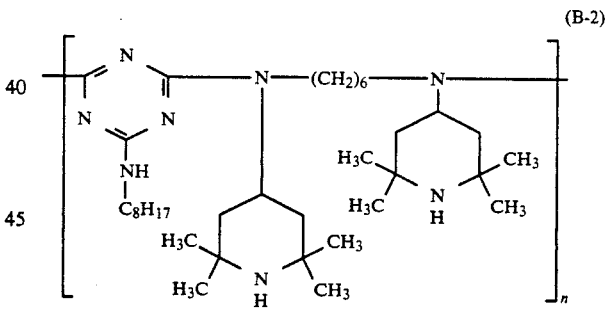

wherein n is 2 to 20,

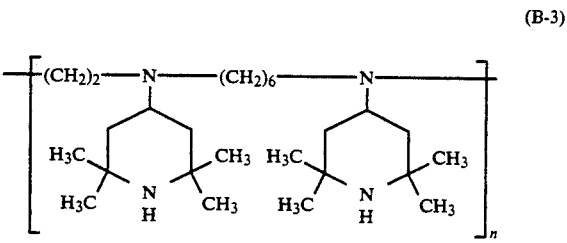

wherein n is 2 to 20;

(C) 0.01 to 1 part by weight of a low-molecular hindered piperidine compound selected from the following formulas (C-1) and (C-2):

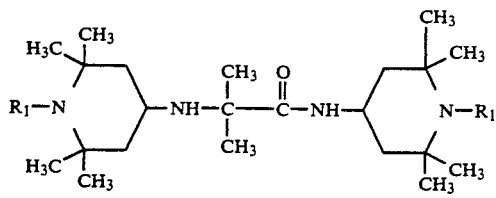

wherein $R_1$ is hydrogen or alkyl of 1 to 3 carbon atoms,

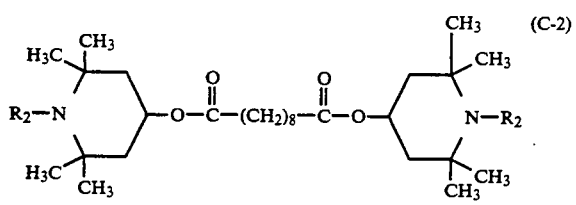

wherein $R_2$ is hydrogen or alkyl of 1 to 3 carbon atoms;

(D) 0.01 to 1 part by weight of a benzoate compound represented by the following formula (D-1):

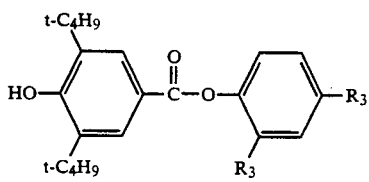

wherein $R_3$ is t-butyl or t-amyl;

(E) 0.01 to 1 part by weight of a phosphorous compound selected from the following formulas (E-1) through (E-5):

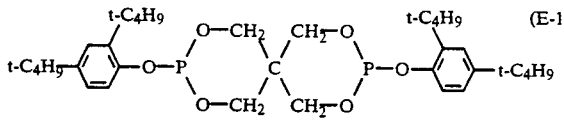

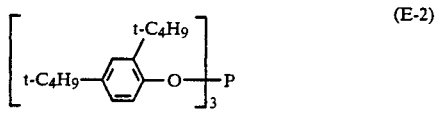

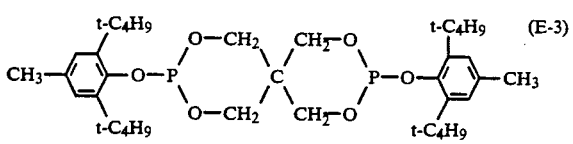

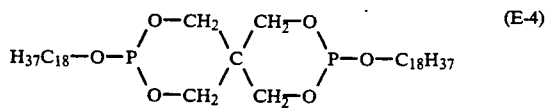

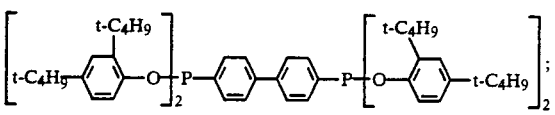

and (F) 0.01 to 1 part by weight of an amide compound represented by the following pormula (F-1):

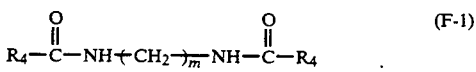

wherein $R_4$ is alkyl of 5 to 21 carbon atoms or alkenyl of 5 to 21 carbon atoms, and m is an integer of 1 to 6.

The present invention further provides a polypropylene resin composition which comprises, in addition to the above components (A), (B), (C), (D), (E) and (F), not more than 0.2 part by weight of a sulfur compound (G) selected from those represented by the following formulas (G-1) and (G-2):

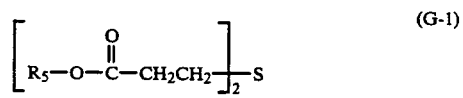

wherein $R_5$ is alkyl of 4 to 20 carbon atoms,

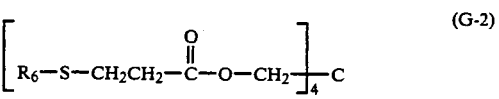

wherein $R_6$ is alkyl of 4 to 20 carbon atoms.

The polypropylene which is a base component of the composition of the present invention may be a homopolymer of propylene and besides, may be copolymers containing an ethylene component in addition to the propylene as a main component, including propylene-ethylene block copolymer and block copolymer of propylene and ethylene-propylene rubber. Among them, the latter, especially block copolymers containing an ethylene component are preferred. When a copolymer containing an ethylene component is used, the ethylene component is contained usually in an amount of not more than 20% by weight based on the weight of the copolymer. The polypropylene resin mixture in the present invention contains an α-olefinic copolymer rubber and an inorganic filler in addition to the above polypropylene.

The α-olefinic copolymer rubber used in the present invention is a rubber-like polymer obtained by copolymerization of two or more α-olefins. The α-olefins which are copolymerizing components include, for example, those of 2–12 carbon atoms. Copolymer rubbers of ethylene and another α-olefin are especially preferred as the α-olefinic copolymer rubber. The α-olefins to be copolymerized with ethylene are, for example, of 3–12 carbon atoms and include, for example, propylene, 1-butene, 1-pentene, 1-hexene, 4-methyl-1-pentene, 1-octene, and mixtures thereof. Among them preferred are propylene and 1-butene. When copolymer rubbers of ethylene and another α-olefin are used, ethylene content in the copolymer rubbers is preferably about 45–95% by weight, more preferably about 50–80% by weight. The α-olefinic copolymer rubbers to be used in the present invention further include those copolymerized with a third component of a straight chain or cyclic monomer having non-conjugated double bond such as 5-ethylidene-2-norbornene and dicyclopentadiene.

Amount of α-olefinic copolymer rubber blended with polypropylene resin is 5–40% by weight, preferably 5–30% by weight based on the total weight of the polypropylene resin mixture. If the amount is less than 5% by weight, the composition is inferior in impact resistance and, if it is more than 40% by weight, the composition becomes troublesome in processability, etc.

Inorganic fillers used in the present invention include, for example, talc, carbon black, titanium dioxide, zinc oxide, aluminum hydroxide, calcium carbonate, magnesium carbonate, calcium sulfate, barium sulfate, calcium silicate, magnesium silicate, micas, sellaite, kaolin, zeolite, silica, asbestos, glass fiber, carbon fiber, barium titanate, and lead titanate. These may be used each alone or in combination of two or more. These inorganic fillers preferably have an average particle size of $20\mu$ or less, more preferably $5\mu$ or less. In the present invention, talc is especially preferred among the inorganic fillers. It is also effective to use talc in combination with other inorganic fillers mentioned above.

Amount of the inorganic filler blended with the polypropylene resin is 5–40% by weight, preferably 5–30% by weight based on the total weight of the polypropylene resin mixture. If the amount is less than 5% by weight, the composition is inferior in rigidity and, if it is more than 40% by weight, the composition becomes troublesome in processability, etc. When talc is used in combination with other inorganic fillers, it is preferred to use the other inorganic fillers in an amount of 0–20% by weight of the polypropylene resin mixture depending on objects and to use talc in such an amount that total amount of inorganic fillers does not exceed 40% by weight.

The polypropylene resin mixture herein comprises the polypropylene, 5 to 40% by weight of the α-olefinic copolymer rubber and 5 to 40% by weight of the inorganic filler. It may contain further components, but usually the balance is the polypropylene. The mixture preferably comprises 50% by weight or more of the polypropylene.

In the present invention, the aforementioned components (A), (B), (C), (D), (E) and (F) are added to the polypropylene resin containing the α-olefinic copolymer rubber and the inorganic filler as mentioned above.

The hindered phenolic compound (A) used in the present invention may be any of those which have a molecular weight of 500 or more and is not critical. Examples thereof are as follows:

A-1: 3,9-Bis[2-{3-(3-t-butyl-4-hydroxy-5-methylphenyl)propionyloxy}-1,1-dimethylethyl]-2,4,8,10-tetraoxaspiro[5.5]undecane,
A-2: Tetrakis[3-(3,5-di-t-butyl-4-hydroxyphenyl)propionyloxymethyl]methane,
A-3: 1,3,5-Tris(4-t-butyl-3-hydroxy-2,6-dimethylbenzyl) isocyanurate,
A-4: 1,3,5-Tris(3,5-di-t-butyl-4-hydroxybenzyl) isocyanurate,
A-5: 1,3,5-Trimethyl-2,4,6-tris(3,5-di-t-butyl-4-hydroxybenzyl)benzene,
A-6: Triethylene glycol bis[3-(3-t-butyl-5-methyl-4-hydroxyphenyl)propionate],
A-7: Octadecyl 3-(3,5-di-t-butyl-4-hydroxyphenyl)propionate,
A-8: Bis[2-t-butyl-4-methyl-6-(3-butyl-5-methyl-2-hydroxybenzyl)phenyl] terephthalate.
A-9: 1,1,3-Tris(2-methyl-4-hydroxy-5-t-butylphenyl)butane.

Any of these hindered phenolic compounds can be used in the present invention, but compounds of A-1 to A-4 are preferred because of their conspicuous effects, and more preferred is A-1.

With reference to the hindered piperidine compounds of (B), the compounds represented by the formula (B-1) are, for example, disclosed in U.S. Pat. No. 4,331,586, the compounds represented by the formula (B-2) are, for example, disclosed in U.S. Pat. No. 4,086,204, and the compounds represented by the formula (B-3) are, for example, disclosed in U.S. Pat. No. 4,104,248. They are commercially available and among them, preferred are compounds represented by the formula (B-1) and compounds represented by the formula (B-2). In the formula (B-2), $-C_8H_{17}$ is usually t-octyl, i.e., 1,1,3,3-tetramethylbutyl, and such compound wherein $-C_8H_{17}$ is 1,1,3,3-tetramethylbutyl is available in the commercial market.

The hindered piperidine compounds of (C) used in the present invention are represented by the aforementioned formula (C-1) or (C-2). $R_1$ in the formula (C-1) is hydrogen or alkyl of 1–3 carbon atoms, among which hydrogen and methyl are preferred from the point of inhibition of light deterioration. $R_2$ in the formula (C-2) is hydrogen or alkyl of 1–3 carbon atoms, among which hydrogen and methyl are preferred from the point of inhibition of light deterioration.

The benzoate compounds of (D) used in the present invention are represented by the aforementioned formula (D-1). $R_3$ in the formula (D-1) is t-butyl or t-amyl, and t-butyl is preferred from the point of inhibition of light deterioration.

The phosphorous compounds of (E) used in the present invention are selected from those represented by the aforementioned formulas (E-1) through (E-5) which are expressed by the following chemical names.

E-1: Bis(2,4-di-t-butylphenyl) pentaerythritol diphosphite,
E-2: Tris(2,4-di-t-butylphenyl) phosphite,
E-3: Bis(2,6-di-t-butyl-4-methylphenyl) pentaerythritol diphosphite,
E-4: Distearyl pentaerythritol diphosphite,
E-5: Tetrakis(2,4-di-t-butylphenyl) 4,4'-biphenylene diphosphonite.

Among these phosphorous compounds of (E), E-1 and E-2 are preferred.

The amide compounds of (F) used in the present invention are represented by the aforementioned formula (F-1). $R_4$ in the formula (F-1) is alkyl or alkenyl of 5–21 carbon atoms and preferably alkyl, more preferably alkyl of 11–18 carbon atoms. The symbol m in the formula (F-1) is an integer of 1–6. Examples of amide compounds of (F) are methylenebisstearylamide, ethylenebisstearylamide, ethylenebisoleylamide, and hexamethylenebisstearylamide.

The above compounds (A), (B), (C), (D), (E) and (F) are essential components in the present invention. Amounts of these components based on 100 parts by weight of the polypropylene resin containing α-olefinic copolymer rubber and inorganic filler are 0.01–1 part by weight, preferably 0.02–0.5 part by weight of hindered phenolic compound (A), 0.01–1 part by weight, preferably 0.1–0.5 part by weight of hindered piperidine compound (B), 0.01–1 part by weight, preferably 0.1–0.5 part by weight of hindered piperidine compound (C), 0.01–1 part by weight, preferably 0.1–0.5 part by weight of benzoate compound (D), 0.01–1 part by weight, preferably 0.02–0.5 part by weight of phosphorous compound (E), and 0.01–1 part by weight, preferably 0.02–0.5 part by weight of amide compound (F). If amounts of these compounds (A), (B), (C), (D), (E) and (F) are less than 0.01 part by weight, the desired effect cannot be sufficiently exhibited, and addition of them in the amounts of more than 1 part by weight gives no further increase of effect and is economically disadvantageous.

Furthermore, according to the present invention, stability against heat, oxidation and light, especially stability against heat and oxidation can be further improved by adding a sulfur compound of (G) in addition to the compounds of (A), (B), (C), (D), (E) and (F). The sulfur compounds of (G) are represented by the aforementioned formula (G-1) or (G-2). $R_5$ in the formula (G-1) is alkyl of 4–20 carbon atoms and is preferably alkyl of 12–18 carbon atoms. $R_6$ in the formula (G-2) is alkyl of 4–20 carbon atoms and is preferably alkyl of 6–18 carbon atoms. Of these sulfur compounds of (G), those which are represented by the formula (G-2) are preferred and especially preferred are those of $R_6$ being alkyl of 6–18 carbon atoms.

Hitherto, it has been considered that hindered amine type light stabilizers and sulfur type antioxidants have antagonium and their combination use is not preferred. However, it has become clear by the present invention that if the sulfur compound is used in a small amount, the effect is rather improved. That is, when sulfur compound (G) is used in the present invention, an amount thereof is 0.2 part by weight or less based on 100 parts by weight of the polypropylene resin mixture containing α-olefinic copolymer rubber and inorganic filler, and excess addition thereof is not preferred because stability against light, in particular, is deteriorated. It is preferred to use the sulfur compound in an amount of at least 0.005 part by weight in order to exhibit the notable effect of using the sulfur compound. More preferred range of addition amount of the sulfur compound (G) is 0.01–0.1 part by weight based on 100 parts by weight of the polypropylene resin mixture.

As far as properties of the composition are not damaged, the polypropylene resin composition of the present invention may further contain other additives such as antioxidants, light stabilizers, metal deactivators, metallic soap, nucleating agents, lubricants, antistatic agents, flame retardants and pigments.

Any methods suitable for obtaining homogeneous compositions can be employed for blending the polypropylene resin with the α-olefinic copolymer rubber, the inorganic filler, the components (A), (B), (C), (D), (E) and (F), the optional component (G) and, other additives to be used, if necessary. That is, these components may be simultaneously blended or may be respectively blended in a plurality of steps. Furthermore, a part or all of these components may be blended as masterbatches. These components can be kneaded by usual methods, for example, using roll, Banbury mixer, single-screw extruder, twin-screw extruder, or the like.

As explained above, the present invention provides polypropylene resin compositions which have high stability against heat, oxidation and light by adding to a polypropylene resin containing an α-olefinic copolymer rubber and an inorganic filler a specific hindered phenolic compound, a specific high-molecular hindered piperidine compound, a specific low-molecular hindered piperidine compound, a specific benzoate compound, a specific phosphorous compound, and a specific amide compound, and, if necessary, a specific sulfur compound. Therefore, these polypropylene resin compositions are especially useful as materials for parts which are exposed to heat, oxygen and light in use, for example, parts of automobiles and electrical equipments.

The following nonlimiting examples will further explain the present invention.

EXAMPLE 1

The components as shown in Table 1 were added to unstabilized propylene-ethylene block copolymer (ethylene content of 7.3% by weight) and they were mixed by a Henschel mixer and further kneaded and pelletized by a 30 mmφ twin-screw extruder. The resulting pellets were molded into test pieces of 60×40×1 mm by a 5.5 ounce injection molding machine. These test pieces were subjected to a weathering test.

The weathering test was carried out in a Sunshine weatherometer (hereinafter referred to as "SWOM") under the conditions of a black panel temperature of 83° C. and a water spray cycle of 18 min/120 min. Evaluation was effected by measuring the time before occurrence of cracks on the surface of the test piece. The results are shown in Table 1 as a life until cracking.

Separately, test pieces of 40×40×1 mm were prepared and stabilities against heat and oxidation were evaluated by measuring the time before 30% of area of the test piece embrittled in a Geer oven of 150° C. The results are shown in Table 1 as a life until embrittlement.

In this example, ethylene-propylene copolymer rubber having an ethylene content of 75% by weight was used as an α-olefinic copolymer rubber.

In Table 1, amounts of α-olefinic copolymer rubber and the inorganic filler are shown as % by weight based on the total amount of the base copolymer, the α-olefinic copolymer rubber and the inorganic filler, and amounts of other additives are shown as part by weight based on 100 parts by weight of the total amount of the base copolymer, the α-olefinic copolymer rubber and the inorganic filler.

Marks A-1 to A-9, B-1 to B-3 and E-1 to E-5 for additives in Table 1 indicate the compounds mentioned hereinbefore as additives used in the present invention. Among them, B-1, B-2 and B-3 indicate mixtures of the repeating unit n being about 2-10. Other marks for additives indicate the following compounds.

C-1: 2-Methyl-2-(2,2,6,6-tetramethyl-4-piperidyl)amino-N-(2,2,6,6-tetramethyl-4-piperidyl)propionamide.
C-2: Bis(2,2,6,6-tetramethyl-4-piperidyl) sebacate.
D-1: 2,4-Di-t-butylphenyl 3,5-di-t-butyl-4-hydroxybenzoate.
F-1: Ethylenebisstearylamide.
G-1: Dimyristyl thiodipropionate.
G-2: Pentaerythritol tetrakis(3-dodecylthiopropionate).

The mark ← in Table 1 means that the same compound as of the left column was used.

TABLE 1 (1)

| | | Examples | | | | | | | | | | | | |
|---|---|---|---|---|---|---|---|---|---|---|---|---|---|---|
| | No. | 1 | 2 | 3 | 4 | 5 | 6 | 7 | 8 | 9 | 10 | 11 | 12 | 13 |
| Resin composition (% by weight) | α-olefininc copolymer rubber | 25 | 25 | 25 | 25 | 25 | 25 | 25 | 25 | 25 | 25 | 25 | 25 | 25 |
| | Inorganic fillers | | | | | | | | | | | | | |
| | Talc | 10 | 10 | 10 | 10 | 10 | 10 | 10 | 10 | 10 | 10 | 10 | 10 | 10 |

TABLE 1 (1)-continued

| | No. | Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| | Carbon black | | | | | | | | | | | | | |
| | Glass fiber | | | | | | | | | | | | | |
| Additives Upper column: Kind Lower column: Part by weight | Phenolic type [(A)] | A-1 0.1 | ← 0.1 | ← 0.1 | ← 0.1 | ← 0.1 | ← 0.1 | ← 0.1 | ← 0.1 | A-2 0.1 | A-3 0.1 | A-4 0.1 | A-5 0.1 | A-6 0.1 |
| | Piperidine type [(B)] | B-1 0.2 | ← 0.2 | ← 0.2 | ← 0.2 | ← 0.2 | ← 0.2 | B-2 0.2 | B-3 0.2 | B-2 0.2 | ← 0.2 | ← 0.2 | ← 0.2 | ← 0.2 |
| | Piperidine type [(C)] | C-1 0.2 | ← 0.2 | ← 0.2 | ← 0.2 | ← 0.2 | C-2 0.2 | C-1 0.2 | ← 0.2 | ← 0.2 | ← 0.2 | ← 0.2 | ← 0.2 | ← 0.2 |
| | Benzoate type [(D)] | D-1 0.2 | ← 0.2 | ← 0.2 | ← 0.2 | ← 0.2 | ← 0.2 | ← 0.2 | ← 0.2 | ← 0.2 | ← 0.2 | ← 0.2 | ← 0.2 | ← 0.2 |
| | Phosphorous type [(E)] | E-1 0.1 | E-2 0.1 | E-3 0.1 | E-4 0.1 | E-5 0.1 | E-1 0.1 | ← 0.1 | ← 0.1 | ← 0.1 | ← 0.1 | ← 0.1 | ← 0.1 | ← 0.1 |
| | Amide type [(F)] | F-1 0.1 | ← 0.1 | ← 0.1 | ← 0.1 | ← 0.1 | ← 0.1 | ← 0.1 | ← 0.1 | ← 0.1 | ← 0.1 | ← 0.1 | ← 0.1 | ← 0.1 |
| | Sulfur type [(G)] | | | | | | | | | | | | | |
| Test results | Life until brittlement (hr) at 150° C. | 1870 | 1880 | 1850 | 1850 | 1840 | 1840 | 1880 | 1850 | 1860 | 1830 | 1840 | 1800 | 1790 |
| | Life until cracking (hr) at 83° C. in SWOM | 2400 | 2340 | 2280 | 2280 | 2280 | 2400 | 2460 | 2220 | 2460 | 2460 | 2460 | 2420 | 2420 |

TABLE 1 (2)

| | No. | Examples | | | | | | | | | | Comparative Examples | | |
|---|---|---|---|---|---|---|---|---|---|---|---|---|---|---|
| | | 14 | 15 | 16 | 17 | 18 | 19 | 20 | 21 | 22 | 23 | 24 | 25 | 26 |
| Resin composition (% by weight) | α-olefinic copolymer rubber | 25 | 25 | 25 | 25 | 25 | 25 | 25 | 10 | 10 | 10 | 25 | 25 | 25 |
| | Inorganic fillers | | | | | | | | | | | | | |
| | Talc | 10 | 10 | 10 | 10 | 10 | 10 | 10 | 30 | 30 | 30 | 10 | 10 | 10 |
| | Carbon black | | | | | | 5 | | | 5 | | | | |
| | Glass fiber | | | | | | | | 5 | | 5 | | | |
| Additives Upper column: Kind Lower column: Part by weight | Phenolic type [(A)] | A-7 0.1 | A-8 0.1 | A-9 0.1 | A-1 0.1 | ← 0.1 | ← 0.1 | ← 0.1 | ← 0.1 | ← 0.1 | ← 0.1 | A-1 0.1 | ← 0.1 | ← 0.1 |
| | Piperidine type [(B)] | B-2 0.2 | ← 0.2 | ← 0.2 | ← 0.2 | ← 0.2 | ← 0.2 | ← 0.2 | ← 0.2 | ← 0.2 | ← 0.2 | ← 0.2 | ← 0.2 | ← 0.2 |
| | Piperidine type [(C)] | C-1 0.2 | ← 0.2 | ← 0.2 | ← 0.2 | ← 0.2 | ← 0.2 | ← 0.2 | ← 0.2 | ← 0.2 | ← 0.2 | ← 0.2 | ← 0.2 | ← 0.2 |
| | Benzoate type [(D)] | D-1 0.2 | ← 0.2 | ← 0.2 | ← 0.2 | ← 0.2 | ← 0.2 | ← 0.2 | ← 0.2 | ← 0.2 | ← 0.2 | ← 0.2 | ← 0.2 | ← |
| | Phosphorous type [(E)] | E-1 0.1 | ← 0.1 | ← 0.1 | ← 0.1 | ← 0.1 | ← 0.1 | ← 0.1 | ← 0.1 | ← 0.1 | ← 0.1 | ← 0.1 | | E-1 0.1 |
| | Amide type [(F)] | F-1 0.1 | ← 0.1 | ← 0.1 | ← 0.1 | ← 0.1 | ← 0.1 | ← 0.1 | ← 0.1 | ← 0.1 | ← 0.1 | F-1 0.1 | ← 0.1 | ← 0.1 |
| | Sulfur type [(G)] | | | | G-1 0.05 | G-2 0.05 | ← 0.05 | ← 0.05 | ← 0.05 | ← 0.05 | ← 0.05 | | | |
| Test results | Life until brittlement (hr) at 150° C. | 1750 | 1770 | 1780 | 1940 | 2150 | 1760 | 2100 | 1720 | 1660 | 1700 | 950 | 1480 | 1460 |
| | Life until cracking (hr) at 83° C. in SWOM | 2420 | 2420 | 2420 | 2520 | 2580 | 2460 | 2520 | 2340 | 2160 | 2280 | 1620 | 1320 | 1380 |

TABLE 1 (3)

| | No. | Comparative Examples | | | | | | | | | | | |
|---|---|---|---|---|---|---|---|---|---|---|---|---|---|
| | | 27 | 28 | 29 | 30 | 31 | 32 | 33 | 34 | 35 | 36 | 37 | 38 |
| Resin composition (% by weight) | α-olefinic copolymer rubber | 25 | 25 | 25 | 25 | 25 | 25 | 25 | 25 | 25 | 10 | 10 | 10 |
| | Inorganic fillers | | | | | | | | | | | | |
| | Talc | 10 | 10 | 10 | 10 | 10 | 10 | 10 | 10 | 10 | 30 | 30 | 30 |
| | Carbon black | | | | | | | | | | | 5 | |
| | Glass fiber | | | | | | | | | | | | 5 |
| Additives Upper column: Kind Lower column: Part by weight | Phenolic type [(A)] | A-1 0.1 | ← 0.1 | | A-1 0.1 | ← 0.1 | ← 0.1 | ← 0.1 | ← 0.1 | | A-1 0.1 | ← 0.1 | ← 0.1 |
| | Piperidine type [(B)] | B-2 0.2 | | B-2 0.2 | ← 0.2 | ← 0.2 | ← 0.2 | ← 0.2 | | B-2 0.2 | ← 0.2 | ← 0.2 | ← 0.2 |
| | Piperidine type | | C-1 | ← | ← | ← | ← | | C-1 | ← | ← | ← | ← |

TABLE 1 (3)-continued

| | No. | \multicolumn{12}{c}{Comparative Examples} |
| | | 27 | 28 | 29 | 30 | 31 | 32 | 33 | 34 | 35 | 36 | 37 | 38 |
|---|---|---|---|---|---|---|---|---|---|---|---|---|---|
| weight | [(C)] | | 0.2 | 0.2 | 0.2 | 0.2 | 0.2 | | 0.2 | 0.2 | 0.2 | 0.2 | 0.2 |
| | Benzoate type | D-1 | ← | ← | ← | ← | | D-1 | ← | ← | ← | ← | ← |
| | [(D)] | 0.2 | 0.2 | 0.2 | 0.2 | 0.2 | | 0.2 | 0.2 | 0.2 | 0.2 | 0.2 | 0.2 |
| | Phosphorous type | E-1 | ← | ← | ← | | E-1 | ← | ← | ← | ← | ← | ← |
| | [(E)] | 0.1 | 0.1 | 0.1 | 0.1 | | 0.1 | 0.1 | 0.1 | 0.1 | 0.1 | 0.1 | 0.1 |
| | Amide type | F-1 | ← | ← | | F-1 | ← | ← | ← | ← | | | |
| | [(F)] | 0.1 | 0.1 | 0.1 | | 0.1 | 0.1 | 0.1 | 0.1 | 0.1 | | | |
| | Sulfur type | | | | G-2 | ← | ← | ← | ← | ← | ← | ← | ← |
| | [(G)] | | | | 0.05 | 0.05 | 0.05 | 0.05 | 0.05 | 0.05 | 0.05 | 0.05 | 0.05 |
| Test results | Life until brittlement (hr) at 150° C. | 1450 | 980 | 350 | 1150 | 1520 | 1500 | 1490 | 1100 | 520 | 920 | 840 | 910 |
| | Life until cracking (hr) at 83° C. in SWOM | 1260 | 1200 | 2160 | 1560 | 1260 | 1320 | 1140 | 1080 | 2040 | 1440 | 1020 | 1380 |

What is claimed is:

1. A polypropylene resin composition which comprises 100 parts by weight of a polypropylene resin mixture comprising a polypropylene, 5 to 40% by weight of an α-olefinic copolymer rubber and 5 to 40% by weight of an inorganic filler, each based on the total weight of the mixture, and said composition further comprising the following components:

(A) 0.01 to 1 part by weight of a hindered phenolic compound having a molecular weight of not less than 500;

(B) 0.01 to 1 part by weight of a high-molecular hindered piperidine compound having a repeating unit selected from the following formulas (B-1) through (B-3):

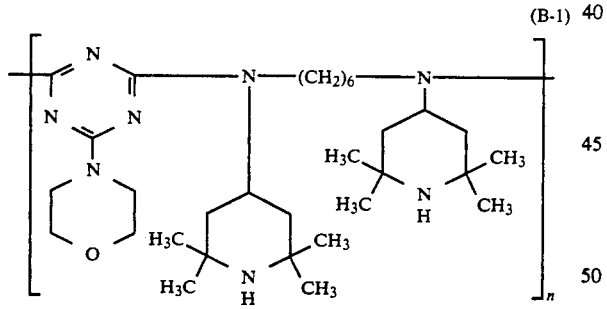

(B-1)

wherein n is 2 to 20,

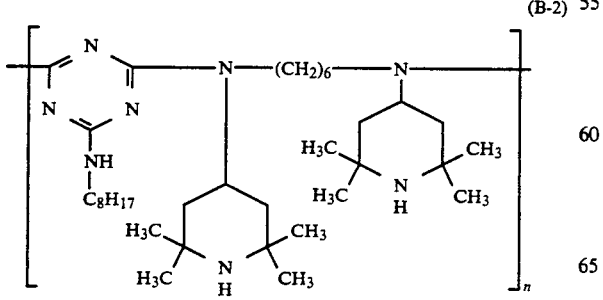

(B-2)

wherein n is 2 to 20,

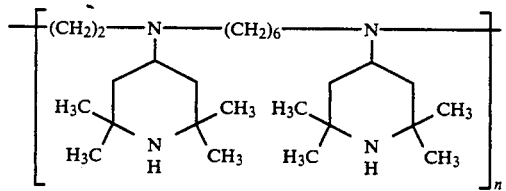

(B-3)

wherein n is 2 to 20;

(C) 0.01 to 1 part by weight of a low-molecular hindered piperidine compound selected from the following formulas (C-1) and (C-2):

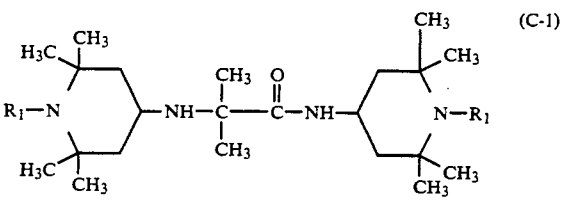

(C-1)

wherein $R_1$ is hydrogen or alkyl of 1 to 3 carbon atoms,

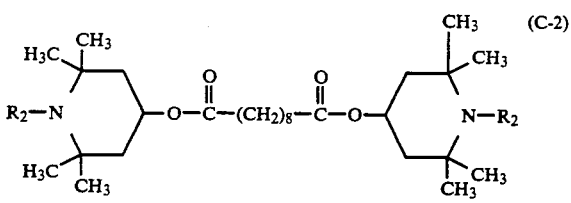

(C-2)

wherein $R_2$ is hydrogen or alkyl of 1 to 3 carbon atoms;

(D) 0.01 to 1 part by weight of a benzoate compound represented by the following formula (D-1):

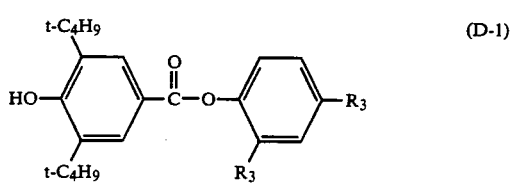

(D-1)

wherein R3 is t-butyl or t-amyl;

(E) 0.01 to 1 part by weight of a phosphorous compound selected from the following formulas (E-1) through (E-5):

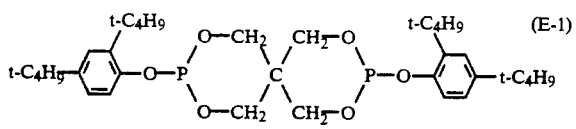
(E-1)

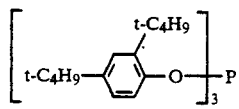
(E-2)

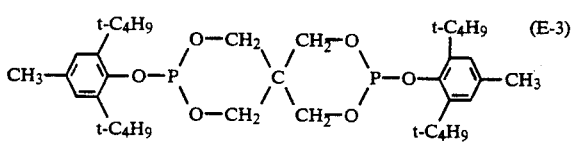
(E-3)

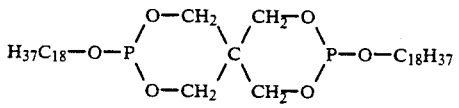
(E-4)

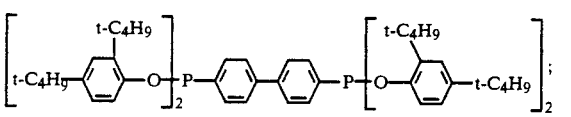
(E-5)

and (F) 0.01 to 1 part by weight of an amide compound represented by the following formula (F-1):

(F-1)

wherein R4 is alkyl of 5 to 21 carbon atoms or alkenyl of 5 to 21 carbon atoms, and m is an integer of 1 to 6.

2. The composition according to claim 1, which further comprises 0.005 to 0.2 part by weight of a sulfur compound selected from the following formulas (G-1) and (G-2):

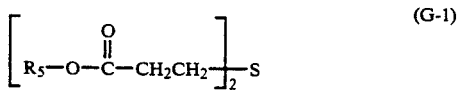
(G-1)

wherein R5 is alkyl of 4 to 20 carbon atoms,

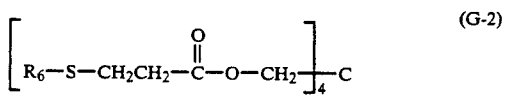
(G-2)

wherein R6 is alkyl of 4 to 20 carbon atoms.

3. The composition according to claim 1, wherein said α-olefinic copolymer rubber comprises a copolymer rubber of ethylene with another α-olefine having 3 to 12 carbon atoms.

4. The composition according to claim 3, wherein an ethylene content in said copolymer rubber is 45 to 95% by weight based on the weight of the copolymer rubber.

5. The composition according to claim 1, wherein said inorganic filler is selected from talc, carbon black, titanium dioxide, zinc oxide, aluminum hydroxide, calcium carbonate, magnesium carbonate, calcium sulfate, barium sulfate, calcium silicate, magnesium silicate, micas, sellaite, kaolin, zeolite, silica, asbestos, glass fiber, carbon fiber, barium titanate and lead titanate.

6. The composition according to claim 5, wherein said inorganic filler comprises talc.

7. The composition according to claim 6, wherein said inorganic filler comprises talc and another inorganic filler.

8. The composition according to claim 7, wherein said another inorganic filler is present in an amount of 0 to 20% by weight based on the weight of the polypropylene resin mixture.

9. The composition according to claim 1, wherein said hindered phenolic compound (A) having a molecular weight of not less than 500 is 3,9-bis[2-{3-(3-t-butyl-4-hydroxy-5-methylphenyl)propionyloxy}-1,1-dimethylethyl]-2,4,8,10-tetraoxaspiro[5.5]undecane, tetrakis[3-(3,5-di-t-butyl-4-hydroxyphenyl)propionyloxymethyl]methane, 1,3,5-tris(4-t-butyl-3-hydroxy-2,6-dimethylbenzyl) isocyanurate,
1,3,5-tris(3,5-di-t-butyl-4-hydroxybenzyl) isocyanurate, 1,3,5-trimethyl-2,4,6-tris(3,5-di-t-butyl-4-hydroxybenzyl)benzene,
triethylene glycol bis[3-(3-t-butyl-5-methyl-4-hydroxyphenyl)propionate],
octadecyl 3-(3,5-di-t-butyl-4-hydroxyphenyl)propionate, bis[2-t-butyl-4-methyl-6-(3-t-butyl-5-methyl-2-hydroxybenzyl)phenyl] terephthalate, or
1,1,3-tris(2-methyl-4-hydroxy-5-t-butylphenyl)butane.

10. The composition according to claim 9, wherein said hindered phenolic compound (A) having a molecular weight of not less than 500 is 3,9-bis[2-{3-(3-t-butyl-4-hydroxy-5-methylphenyl)propionyloxy}-1,1-dimethylethyl]-2,4,8,10-tetraoxaspiro[5]undecane.

11. The composition according to claim 1, wherein said high-molecular hindered piperidine compound (B) has a repeating unit of the formula (B-1) or (B-2).

12. The composition according to claim 1, wherein said low-molecular hindered piperidine compound (C) has the formula (C-1) in which R1 is hydrogen or methyl, or has the formula (C-2) in which R2 is hydrogen or methyl.

13. The composition according to claim 1, wherein said benzoate compound (D) has the formula (D-1) in which R3 is t-butyl.

14. The composition according to claim 1, wherein said phosphorous compound (E) has the formula (E-1) or (E-2).

15. The composition according to claim 1, wherein said amide compound (F) has the formula (F-1) in which R4 is alkyl of 11 to 18 carbon atoms.

16. The composition according to claim 1, wherein said amide compound (F) is methylenebisstearylamide, ethylenebisstearylamide, ethylene-bisoleylamide, or hexamethylenebisstearylamide.

17. The composition according to claim 1, which contains 0.02 to 0.5 part by weight of said hindered phenolic compound (A), 0.1 to 0.5 part by weight of said high-molecular hindered piperidine compound (B), 0.1 to 0.5 part by weight of said low-molecular hindered piperidine compound (C), 0.1 to 0.5 part by weight of said benzoate compound (D), 0.02 to 0.5 part by weight of said phosphorous compound (E), and 0.02 to 0.5 part by weight of said amide compound (F), each based on 100 parts by weight of said polypropylene resin mixture.

18. The composition according to claim 2, wherein said sulfur compound has the formula (G-1) in which $R_5$ is alkyl of 12 to 18 carbon atoms.

19. The composition according to claim 2, wherein said sulfur compound has the formula (G-2) in which $R_6$ is alkyl of 6 to 18 carbon atoms.

20. The composition according to claim 2, wherein said sulfur compound is present in an amount of 0.01 to 0.1 part by weight based on 100 parts by weight of said polypropylene resin mixture.

* * * * *